US009451385B2

(12) United States Patent
Bramley et al.

(10) Patent No.: US 9,451,385 B2
(45) Date of Patent: *Sep. 20, 2016

(54) APPARATUS FOR TRANSFERRING ADVERTISING CONTENT TO A MOBILE TELEPHONE

(71) Applicant: CRITICAL PATH DATA CENTRE LIMITED, Cheshire (GB)

(72) Inventors: Lei Bramley, London (GB); Russell Bulmer, London (GB); Andrew Tiller, London (GB); Neil Pepper, London (GB)

(73) Assignee: Synchronoss Technologies, Inc., Bridgewater, NJ (US)

(*) Notice: Subject to any disclaimer, the term of this patent is extended or adjusted under 35 U.S.C. 154(b) by 15 days.

This patent is subject to a terminal disclaimer.

(21) Appl. No.: 14/809,585

(22) Filed: Jul. 27, 2015

(65) Prior Publication Data
US 2015/0334507 A1 Nov. 19, 2015

Related U.S. Application Data

(62) Division of application No. 12/515,030, filed as application No. PCT/GB2007/050694 on Nov. 15, 2007, now Pat. No. 9,094,511.

(30) Foreign Application Priority Data

Nov. 15, 2006 (GB) .................................. 0622792.0

(51) Int. Cl.
G06F 15/16 (2006.01)
H04W 4/00 (2009.01)
G06Q 30/02 (2012.01)
H04M 1/725 (2006.01)
H04M 3/487 (2006.01)

(52) U.S. Cl.
CPC ............ H04W 4/003 (2013.01); G06Q 30/02 (2013.01); G06Q 30/0255 (2013.01); H04M 1/72544 (2013.01); H04M 1/72558 (2013.01); H04M 3/4878 (2013.01); H04M 1/72572 (2013.01)

(58) Field of Classification Search
CPC ......... H04M 3/4878; H04M 1/72544; H04M 1/72572
USPC .......................................... 709/203, 217–219
See application file for complete search history.

(56) References Cited

U.S. PATENT DOCUMENTS

2002/0072353 A1* 6/2002 Kim .................. H04M 1/72519 455/414.1
2015/0046262 A1* 2/2015 Kim .................. G06Q 30/0259 705/14.57

FOREIGN PATENT DOCUMENTS

WO 00/56781 9/2000
WO 2005/025252 3/2005

OTHER PUBLICATIONS

International Search Report, dated Feb. 27, 2008, issued in priority International Application No. PCT/GB2007/050694.
International Preliminary Report on Patentability (IPRP), dated May 19, 2009, and Written Opinion, issued in priority International Application No. PCT/GB2007/050694.

* cited by examiner

Primary Examiner — Minh-Chau Nguyen
(74) Attorney, Agent, or Firm — Synchronoss Technologies, Inc.; Frederick W. Dour

(57) ABSTRACT

A mobile telephone obtains (or is supplied) advertising content from a remote server and locally stores that advertising content. The advertising content is then automatically shown in association with a running, in use (e.g. in foreground) application that generates a screen that an end-user interacts with ('an end-user application'). The content is shown 'automatically' in the sense that the advertising content is displayed without the end-user explicitly requesting any specific item of content, (although he may opt-in to the general approach of having advertising content displayed on his mobile telephone). The telephone itself determines which adverts etc. it should display, depending on which application is currently being used (i.e. is currently displayed on screen).

4 Claims, 2 Drawing Sheets

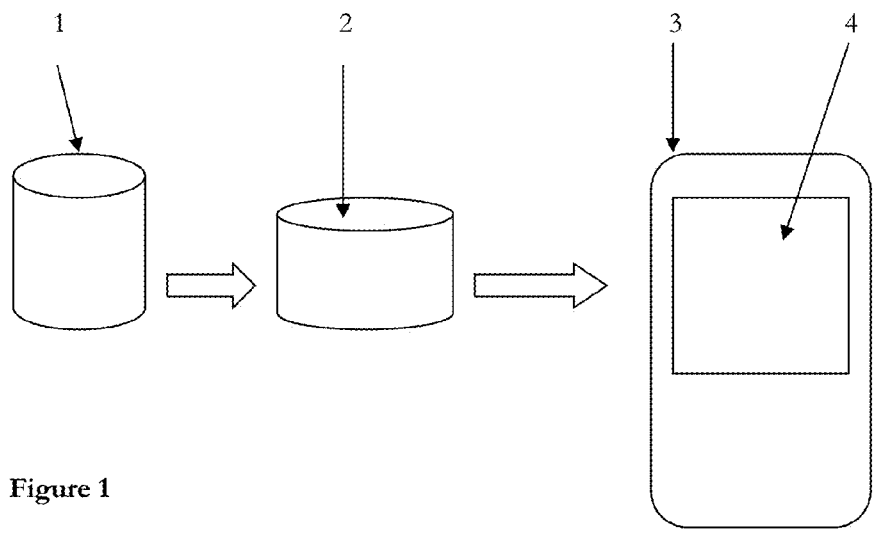
Figure 1
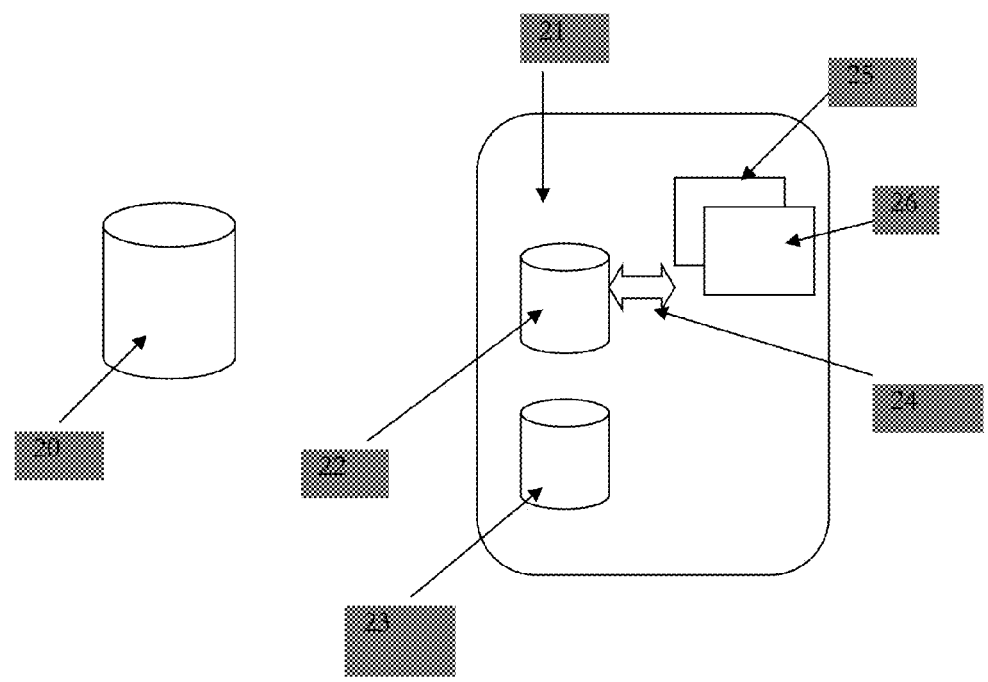

APPARATUS FOR TRANSFERRING
ADVERTISING CONTENT TO A MOBILE
TELEPHONE

CROSS REFERENCE TO RELATED
APPLICATIONS

This application is a divisional of U.S. application Ser. No. 12/515,030, filed Dec. 8, 2009, which claims the priority of PCT/GB2007/050694, filed on Nov. 15, 2007, which claims priority to Great Britain (GB) Application No. 0622792.0, filed Nov. 15, 2006, the entire contents of each of which are fully incorporated herein by reference

BACKGROUND OF THE INVENTION

1. Field of the Invention

This invention relates to an apparatus for transferring advertising content to a mobile telephone; it relates also to a method of selecting appropriate advertising content to display in association with applications running on a mobile telephone.

2. Description of the Prior Art

It is becoming increasingly common to show advertisements on a mobile telephone. The typical approach, exemplified by the AdMob™ service, is for a publisher of a mobile web site (e.g. a WAP site) to add some lines of AdMob code to their web site. An advertiser creates an advert, sends that advert to a central AdMob server and then bids on that server to have it included on selected mobile web sites. The server analyses bids and sends adverts that have the highest bids to the appropriate mobile web sites, so that those adverts are displayed on mobile telephones when users view those web sites with a browser. When a user clicks on an advert on a mobile web site, the advertiser pays both AdMob and the owner of the mobile web site. Advertising systems such as this have an important role to play because they can encourage people to create new mobile web sites and enable mobile users to locate products and services of interest.

One limitation of this typical approach is that it works only with mobile web sites (e.g. WAP sites)—i.e. sites that are seen and interacted with using a browser application running on the mobile telephone. Although browsers are commonplace, the experience of interacting with mobile web sites using a browser can be poor. Also, adverts may not be relevant to an end-user and hence may be irritating (conversely, if adverts that are genuinely useful to end-users could be displayed on a mobile telephone at the right time, then it is likely that click-through rates would be relatively high, given the closer relationship many users have with their mobile telephones, compared with their desktop PCs.)

Further, mobile telephones and PDAs are becoming increasingly powerful and able to run multiple local applications (e.g. Java applications) very quickly; these make WAP sites appear very cumbersome. But to date, there has been no viable and effective way of displaying advertising on these local applications.

SUMMARY OF THE INVENTION

The invention is an apparatus for transferring advertising content to a mobile telephone; the apparatus comprises:
(a) a server for storing the advertising content and sending that content to a mobile telephone over a wireless network;
(b) a mobile telephone operable to store the content in a content memory;
(c) a client application on the telephone automatically providing appropriate advertising content for one or more end-user applications to display, so that a specific end-user application automatically displays advertising content that is appropriate for it.

A related method includes the steps of selecting which advertising content, obtained from a remote server and stored on a mobile telephone, should be displayed on the mobile telephone; the method comprises the step of a client application on the telephone automatically providing appropriate advertising content for one or more end-user applications to display, so that a specific end-user application automatically displays advertising content that is appropriate for it.

The present invention hence provides for the telephone itself to obtain or be supplied advertising content from a remote server and to locally store that advertising content. This advertising content is then automatically shown in association with a running, in use (e.g. in foreground) application that generates a screen that an end-user interacts with (an end-user application'). The content could include text, images, sound and multi-media content. The content is shown 'automatically' in the sense that the advertising content is displayed without the end-user explicitly requesting any specific item of content, (although he may opt-in to the general approach of having advertising content displayed on his mobile telephone). The advertising content may be shown at the same time as content generated by the application itself (e.g. in a small window underneath the display generated by the application) or there may be short breaks away from the application itself during which the advertising content is shown.

The telephone itself then determines which adverts etc. it should display, depending on which application is currently being used (i.e. is currently displayed on screen). It should be noted that in some mobile telephones, it is possible to have several applications concurrently in use and being displayed/controlling screen estate, e.g. each within their own window, or running in different areas of the screen; each application could be associated with different advertising content.

By enabling the telephone itself to automatically display locally stored advertising content etc., depending on the particular application being used, it is possible to have advertising content displayed in different end-user applications running locally on the telephone. These end-user applications will typically operate far more rapidly than WAP based sites, with their associated high latency links. The present invention hence enables advertising content that is context appropriate to be rapidly retrieved and included within many of these end-user applications, each running on a mobile telephone. This contribution is itself predicated on the mobile telephone itself including new components (albeit ones that may be implemented in software)—namely, in an implementation, (a) the client application that downloads the advertising content from a remote server and exposes a generic API accessible to many different end-user applications running on the telephone, enabling each to request/be sent appropriate advertising content and (b) the local store of advertising content.

This difference over the prior art is illustrated in FIGS. 1 and 2. FIG. 1 shows a typical prior art advertising content distribution system, in which a content server 1, that hosts advertising content, feeds content to mobile WAP sites 2. Mobile WAP sites 2 incorporate the advertising content into their own content. A mobile telephone 3 includes a browser application 4 that enables a user to view WAP sites 2 over a wireless link.

An implementation of the present invention is shown schematically in FIG. 2. A content server 20 stores content. A wireless connection links the content server with a mobile telephone 21. A client application (advertising engine) 22 loaded onto the mobile telephone retrieves content from the server 20 and places it into local content store 23 (which is typically the main memory of the device—not necessarily a dedicated memory). It uses a data replication system (not shown) to obtain the content. The client application 22 exposes an open API 24, enabling any end-user application 25, 26, running on the device to call for or be pushed appropriate content from the client application 22, which in turn retrieves appropriate content from the local store 23 and provides it to the application for display.

Further optional implementation features include:
the client application is a plug-in.
the client application is a DLL (dynamic linker library).
the client application exposes an interface that enables any application running on the telephone that can interact with that interface to retrieve or to be pushed content/adverts etc. using the client application.
the content/adverts etc. are of a type defined by a particular application on the telephone, or that meet criteria defined by or associated with that application; the application defines the media type and the required screen dimensions for the advertising content and the criteria include one or more of the gender, age, location, interests, telephone model of a user.
the client application records the number of times content/adverts etc. has been viewed.
the client application records the length of time content/adverts etc. have been viewed.
the client application records how often a user clicks on content/adverts etc. to interact with them or obtain further information or a service relating to them.
the client application records one or more of the gender, age, location, interests, telephone model of a user that has viewed content/advert.
the client application transmits its records to a remote server.
the client application determines for how long content/adverts etc. should be continuously displayed or changed for new content/adverts etc.
the telephone downloads new content/adverts etc. from a remote server as an automatic, background process that does not interrupt normal use of the telephone.
the automatic, background process is a data replication or synchronisation process between the telephone and the remote server.
the type of content/adverts etc. downloaded to a particular telephone are of a type appropriate to one or more applications on that telephone and to the particular telephone model.
if a diary application is being used, then the type of content/adverts etc. defined by the diary application for retrieval using the client application are adverts for events (e.g. cinema, sports, TV).
if a personal finance/e-wallet application is being used, then the type of content/adverts etc. defined by the personal finance/e-wallet application for retrieval using the client application are adverts from banks/financial services.
if a music download or play application is being used, then the type of content/adverts etc. defined by the music application for retrieval using the client application include adverts for new CDs, tracks, ringtones, videos and concerts etc.
if a games related application is being used, then the type of content/adverts etc. defined by the games related application for retrieval using the client application are adverts for new games.
More generally, the advertising content automatically displayed is selected to be context appropriate, given the live/in-use application.

Another aspect is a method of displaying adverts on a mobile telephone, in which:
(a) a client application is installed onto the telephone, the client application: (i) managing the download and storage of advertising content from a remote server and the presentation of any advertising content and (ii) exposing an interface that enables any end-user application running on the telephone that can interact with that interface to retrieve or to be pushed appropriate content using the client application; and
(b) the client application automatically displaying that appropriate advertising content.

Another aspect is a mobile telephone when displaying adverts using any of the methods defined above.

A final aspect is an end-user application running on a mobile telephone, the end-user application (i) interfacing with a client application resident on the telephone and (ii) automatically displaying advertising content retrieved by the client application from a local memory storing advertising content on the telephone, that content being appropriate to the application.

BRIEF DESCRIPTION OF THE DRAWINGS

The invention is described with reference to the accompanying drawings in which:
FIG. 1 schematically depicts a prior art advertising content distribution system, in which a WAP browser on a mobile telephone views WAP content that includes advertising supplied by a content server;
FIG. 2 schematically depicts an implementation of the present invention in which a mobile telephone replicates advertising content from a remote server; the mobile telephone locally stores content and makes appropriate advertising content available for display in various applications running on the telephone.

DETAILED DESCRIPTION

Figure 3:
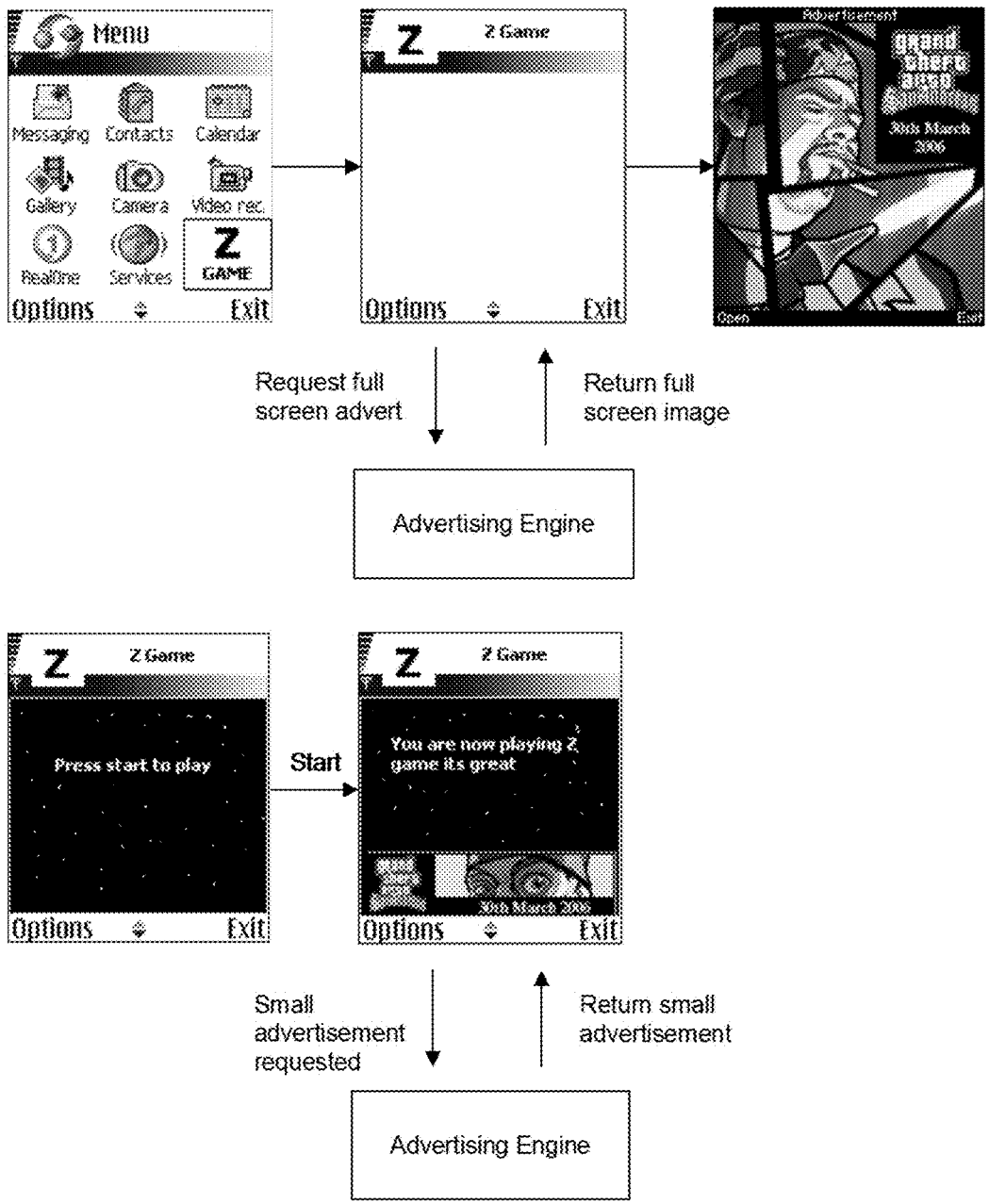
FIG. 3 includes screenshots from a mobile telephone that implements the present invention.

This section describes an implementation of the present invention in which mobile advertising middleware is used to deliver advertisements to any application on a mobile device, and record the number of times these advertisements are viewed. The middleware includes a mobile client application (the advertising engine), a central server, and the communications protocol that is used to communicate between the two.

Mobile Advertising Engine

This technology provides a means to replicate any data between a mobile telephone and a central server. The mobile advertising middleware uses this replication technology to deliver advertisements (which may include images, video, sounds and text), to the advertising engine on the mobile device.

The advertising engine works as a plug-in that can be used by any application on the telephone to manage the download and presentation of adverts. The engine also records the number of times advertisements are viewed/played/clicked on the mobile device by the end user, and sends these statistics back to the central server.

The advertising engine is a DLL that any other application can use to retrieve advertisements of the type they wish to display. This allows application developers to generate revenue by displaying advertisements within their applications.

Use Case

The following example illustrates how the advertising engine may be used by an application on a mobile device. A low budget developer distributes a game application as shareware. Instead of relying on donations, the developer can use the advertising engine to generate revenues. The game connects to the advertising engine to retrieve and display advertisements at various points during the game (see FIG. 3).

For example, the user starts the game, which immediately retrieves a full screen advert from the advertising engine and displays it on the screen for a few seconds.

At the beginning of play, the game retrieves a smaller advert from the advertising engine and displays it unobtrusively at the bottom of the screen. The advert displayed may be swapped for a different advert at appropriate points (e.g. every minute, or at level changes).

The mobile advertising middleware serves relevant advertisements according to the target audience for the game, and collects information at a central server about the number of times each advertisement is viewed. Revenue is collected by the service provider operating the mobile advertising middleware, and an agreed share is given to the game developer.

The above scenario is a very simple example of how the mobile advertising middleware could be used. In practice, commercial applications could use the advertising engine to provide a much richer advertising experience on a mobile telephone—for example using video and audio.

Technical Outline

The mobile advertising middleware provides the following functions:

Initial Seeding

The advertising engine is initially seeded with a number of generic adverts to enable the engine to be used without a significant download of data to the telephone. Typically this would include a number of small images.

Advert Updates

The advertising engine uses replication technology to periodically download new advertisements to the mobile device in the background, without interrupting normal use of the telephone. The replication technology is described in WO 2004/057828, the contents of which are incorporated by reference. The advertising engine can be configured to connect and download a new set of adverts at specified time intervals, or after a certain proportion of the current adverts have been viewed.

Advert Retrieval

The advertising engine presents an application programming interface (API) on the device, allowing any local application to retrieve an advert. The mechanism supports simple or complex advert retrieval:

For the simple retrieval option, the application requests an advert of a particular media type (image, video etc.) and specifies the screen dimensions available for display. The advertising engine randomly selects and returns an advert that fits the criteria provided.

The complex retrieval system allows the application to specify more detailed criteria for the type of advert required. For example, an application that requires a user to register or sign up before use could pass the information gathered (such as gender, age, location, interests etc.) to the advertising engine, which would filter the adverts available for an appropriate selection.

Advert Usage

All adverts that are requested from the advertising engine are recorded and details sent back to the central server when a connection is made. The details stored may consist of the number of views of each advert, the number of times they were requested, and the user details from the more complex advert retrieval system requests.

Reporting to Partners

Usage statistics are recorded by the central server and made available to advertising partners via a web site. The web site also enables partners to submit and manage the adverts they want to offer for display on mobile devices via the mobile advertising middleware.

The invention claimed is:

1. A method of selecting which advertising content, obtained from a remote server and stored on a mobile telephone, should be automatically displayed on the mobile telephone; the method comprising the step of a client application on the telephone automatically providing appropriate advertising content for one or more end-user applications to display, so that a specific end-user application automatically displays advertising content that is appropriate for it wherein, if a diary application is being used, then the type of adverts defined by the diary application for retrieval using the client application are adverts for events (e.g. cinema, sports, TV).

2. A method of selecting which advertising content, obtained from a remote server and stored on a mobile telephone, should be automatically displayed on the mobile telephone; the method comprising the step of a client application on the telephone automatically providing appropriate advertising content for one or more end-user applications to display, so that a specific end-user application automatically displays advertising content that is appropriate for it wherein, if a personal finance/e-wallet application is being used, then the type of adverts defined by the personal finance/e-wallet application for retrieval using the client application are adverts from banks/financial services.

3. A method of selecting which advertising content, obtained from a remote server and stored on a mobile telephone, should be automatically displayed on the mobile telephone; the method comprising the step of a client application on the telephone automatically providing appropriate advertising content for one or more end-user applications to display, so that a specific end-user application automatically displays advertising content that is appropriate for it wherein, if a music download or play application is being used, then the type of adverts defined by the music application for retrieval using the client application include adverts for new CDs, tracks, ringtones, videos and concerts etc.

4. A method of selecting which advertising content, obtained from a remote server and stored on a mobile telephone, should be automatically displayed on the mobile telephone; the method comprising the step of a client application on the telephone automatically providing appropriate advertising content for one or more end-user applications to display, so that a specific end-user application automatically displays advertising content that is appropriate for it wherein, if a games related application is being used, then the type of adverts defined by the games related application for retrieval using the client application are adverts for new games.

\* \* \* \* \*